United States Patent Office 3,285,259
Patented Nov. 15, 1966

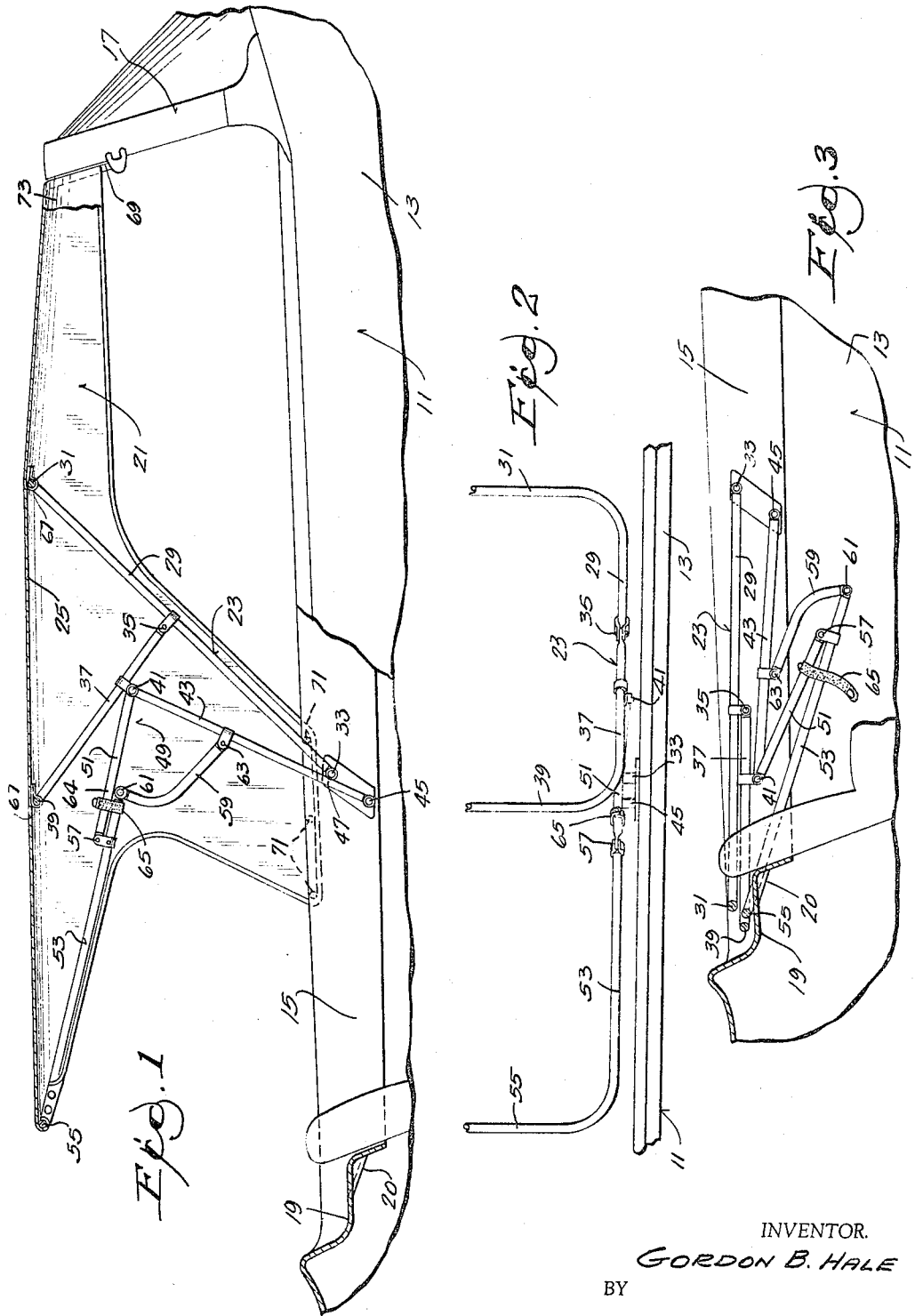
Nov. 15, 1966  G. B. HALE  3,285,259
FOLDING SOFT TOP
Filed Nov. 29, 1963  2 Sheets-Sheet 1
INVENTOR.
GORDON B. HALE
BY
Wheeler, Wheeler & Wheeler
ATTORNEYS Nov. 15, 1966  G. B. HALE  3,285,259
FOLDING SOFT TOP
Filed Nov. 29, 1963  2 Sheets-Sheet 2
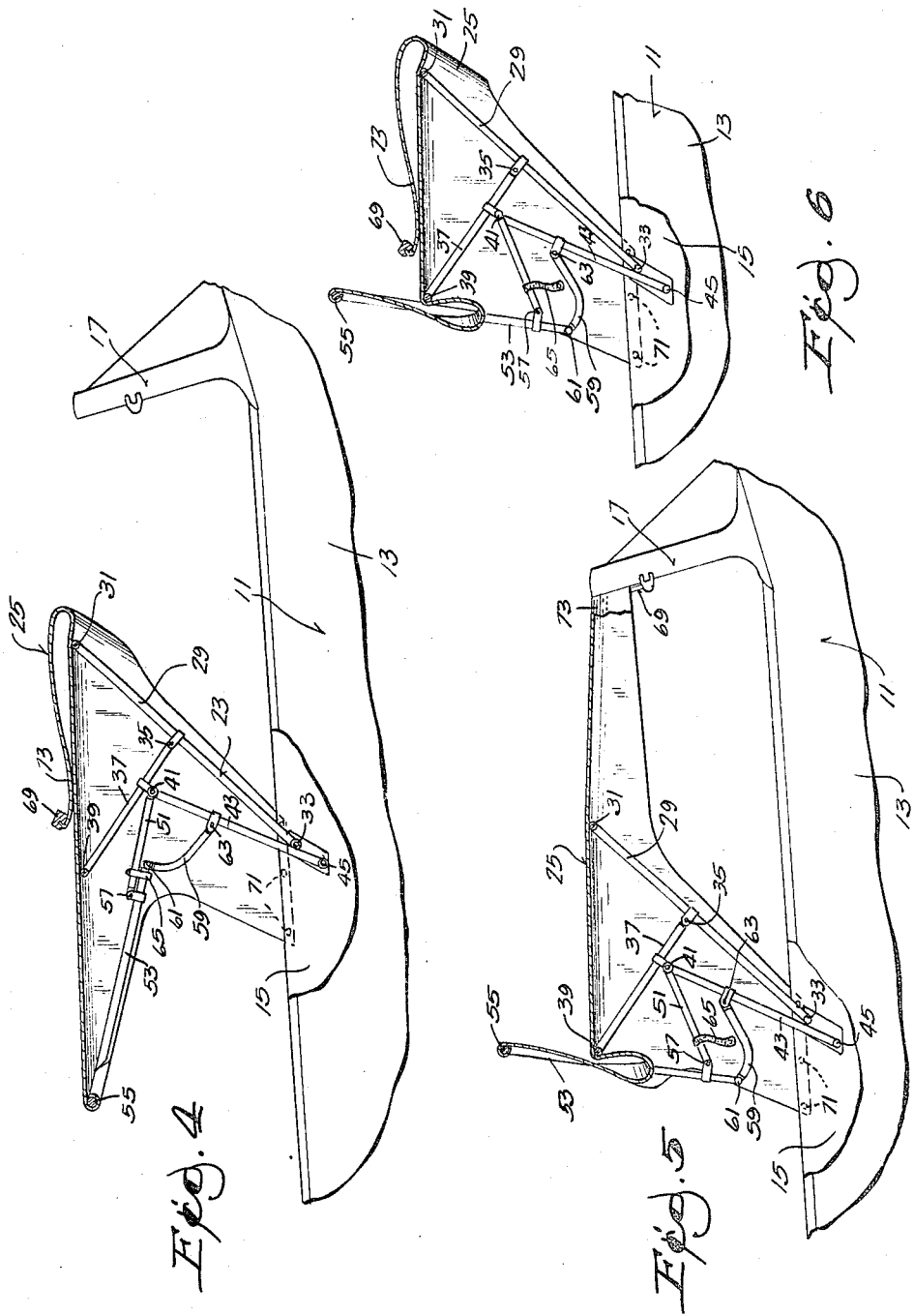
INVENTOR.
GORDON B. HALE
BY
Wheeler, Wheeler & Wheeler
ATTORNEYS

3,285,259
FOLDING SOFT TOP
Gordon B. Hale, Waukegan, Ill., assignor to Outboard Marine Corporation, Waukegan, Ill., a corporation of Delaware
Filed Nov. 29, 1963, Ser. No. 326,887
19 Claims. (Cl. 135—6)

The invention relates generally to convertible soft tops for vehicles such as boats or the like.

The invention provides a soft top including a frame having a main part or portion including three serially connected links and means on one of the first and third links which is engageable with a point fixed with respect to the supporting structure for establishing the soft top in erected position. Specifically, the frame is designed for mounting the first and third links on a support with one of the pivotal mountings being spaced rearwardly and below the other, and so that the first and third links are movable to a limiting, self-standing, erect position established by engagement of the link carried by the lower pivot with the pivotal mounting of the other link.

The invention further provides for incorporation in the soft top frame of a sublinkage which is swingable when the main portion of the frame is in erected condition between an erected position in covering relation to a part of a vehicle and a generally upwardly extending, self-standing position permitting access to said part of the vehicle without otherwise affecting the erected condition of the main part of the frame.

In addition, the invention provides for the combination of a soft top embodying various of the above mentioned features and a boat. Other objects and advantages of the invention will become known by reference to the following description and accompanying drawings in which FIG. 1 is a fragmentary side elevational view, partially in section, of the combination of a boat and a soft top in accordance with the invention;

FIG. 2 is a fragmentary top plan view of the boat and soft top shown in FIG. 1, with the cover omitted;

FIG. 3 is a side elevational view, partially in section, of the boat and soft top shown in FIG. 1, with the soft top cover omitted and with the soft top frame shown in collapsed or stored condition;

FIG. 4 is a fragmentary, and partially broken away, side elevational view of the boat and soft top shown in FIG. 1, with the soft top shown in erected condition and partially opened for entry into the forward part of the boat;

FIG. 5 is a view similar to FIG. 4 showing a rearward part of the soft top in opened condition to facilitate entering into an after part of the boat; and FIG. 6 is a view similar to FIGS. 4 and 5 showing the soft top in an erected condition with both forward and rearward parts opened to facilitate entry into the boat.

The boat 11 shown in FIG. 1 can be of any conventional construction including a hull 13 having a cockpit or passenger well 15 and a windshield 17 located forwardly of the passenger well. Rearwardly of the passenger well 15, the boat hull preferably includes a shelf 19, including notches 20, for receiving a portion of the soft top still to be described when in collapsed condition for storage.

Mounted on the boat hull 13 is a soft top 21 including a frame 23 and a cover 25 carried by the frame. As will be seen, the soft top 21 is pivotally mounted on the boat hull for movement between an erected condition and stored or collapsed condition.

The frame 23 comprises a main part including a pair of identical linkages on each side of the boat hull, which linkages are integrated by forming certain corresponding components of the linkages as the legs of U-shaped bows straddling the boat hull. More particularly, each linkage includes a first or forward link 29 which forms a part of a forward cross bow 31 and which, at its lower end, is mounted by means of a pivot 33 to a point on the boat hull 13. Intermediate its ends, the first link carries a pivot 35 to which there is pivotally mounted one end of a second link 37 which forms a part of a cross bow 39. Carried by the second link 37 intermediate its ends is another pivot 41 to which there is pivotally connected one end of a third or rearward link 43. At its other end, the third link 43 is connected by a pivot 45 to the boat hull 13. The pivot 45 supporting the third link 43 is located rearwardly and below the pivot 33 supporting the first link 29.

Means are provided for establishing and retaining the soft top 21 in its erected condition. Such means includes means on one of the first link 29 and third link 43 for engagement with a point, surface, or element fixed with respect to the boat hull 13 to limit clockwise movement of the frame 23, as seen in FIG. 1, after the center of gravity of the soft top is located in position to cause collapse of the frame toward the forward part of the boat. In the disclosed construction, such means takes the form of a part 47 of the third link 43 which engages the part of the first link 29 connected to the pivot 33 to prevent further clockwise movement of the frame.

Carried by the above described main portion of the frame 23 at the rear thereof are identical sublinkages 49, each including a fourth link 51 which, at one end, is pivotally connected to the main portion of the frame 23 about the pivot 41 connecting the second link 37 to the third link 43. Also included in the sublinkage 49 is a fifth link 53 which forms a part of a rearward cross bow 55 and which is pivotally connected, intermediate its length, to a pivot 57 carried at the outer end of the fourth link 51. Also included in each of the linkages 49 is a bent brace 59 which, at one end, is joined at a pivot 61 to the forward end of the fifth link 53. At its other end, the brace is connected to a pivot 63 carried by the third link 43 intermediate its ends. Thus, the cross bow 55 can be swung in a clockwise direction, as seen in the drawings, from an erect position as shown in FIG. 1 to a position as shown in FIGS. 5 and 6 affording partial opening of the soft top at the rear of the passenger well.

The erect position of the sublinkages 49 as shown in FIG. 1 can be established by engagement of one of the brace 59 and the fifth link 53 with one of the third link 43 and fourth link 51. In the disclosed construction, the erect condition of the sublinkage 49 is established by engagement of the pivotal connection 61 between the brace 59 and pivotal link 53 with an intermediate part 64 of the fourth link 51.

Normally, the action of gravity will retain the cross bow 55 in its erected position. However, means are also provided for locking the cross bow 55 in its erected position. Such means takes the form of a strap 65 which can be releasably connected at its ends and which encircles a segment of the fifth link 53 between the pivots 57 and 61 and the adjacent outer end part of the fourth link 51.

The cover 25 can be constructed of any suitable material, such as canvas, and is connected to the cross bows 31 and 39 by suitable means, such as loops 67. At its forward end, the cover 25 includes means 69 for releasable attachment to the windshield 17. At its rearward sides, the cover includes means 71 for releasable attachment thereof to the boat hull 13. At its rearward end, the cover 25 is fixed to the intermediate portion of the cross bow 55.

In operation, when the forward part 73 of the cover 25 is detached from the windshield 17, when the rearward sides are detached from the boat hull, and when the sublinkages 49 are unlocked, the soft top 21 can be readily displaced from its erected condition, as shown in FIG. 1, to its collapsed condition on the shelf 19 as shown in FIG. 3. Such action is achieved by merely thrusting the cross bow 31 rearwardly to effect counterclockwise movement about the pivot 33. Resulting rearward movement of the second link 37 and third link 43, in cooperation with the stiffness of the cover 25, causes the cross bow 55 to move rearwardly and downwardly and effects pivotal movement of the fourth link 51 in the counterclockwise direction relative to the fifth link 53 until the fourth link 51 extends generally rearwardly from the pivot 57 in overlying relation to the fifth link 53. In its collapsed or stored condition, the intermediate portions of the bows 31, 39 and 55 are supported on the shelf 19 and portions of the links 53 are received in the notches 20. Because of the length of the links and the location of the pivots, the frame is smoothly displaceable to its collapsed condition.

Erection of the frame 23 can be accomplished simply by drawing the forward cross bar 31 forwardly, thereby erecting the other portions of the frame, until engagement of the third link 43 with the first link 29 at the pivot 33. When the soft top is in its erected condition, access to the forward part of the passenger well 15 can be readily had by detaching the forward part 73 of the cover from the windshield 17 and folding the portion 73 back as shown in FIG. 4 without otherwise affecting the erected condition of the frame 23.

Access can be readily had to the rearward part of the passenger well 15 by unlocking the strap 57 and by pivotally displacing the cross bow 55 in the clockwise direction as seen in the drawings until the position shown in FIG. 5 is assumed. As shown in FIG. 6, access can be simultaneously had to the front and the rear of the passenger well 15 without otherwise affecting the erected condition of the main portion of the frame 23.

Various of the features of the invention are set forth in the appended claims.

What is claimed is:

1. A frame for a soft top for a vehicle, said frame comprising a first link adapted at one end to be pivotally connected to a support, a second link pivotally connected at one end to said first link intermediate the ends thereof, a third link adapted at one end to be pivotally connected to the support and pivotally connected at its other end to said second link at a point spaced from said one end thereof, and means on one of said first and said third links for engagement with a surface fixed with relation to the support to establish the frame in an erected condition when the frame is mounted on the support.

2. A frame in accordance with claim 1 in further combination with a fourth link pivotally connected at one end to one of said second and third links, a fifth link pivotally connected to said fourth link at the other end thereof, a brace pivotally connected to said fifth link and to said third link, and means on one of said fifth link and said brace and on one of said fourth link and said third link for establishing said fifth link in an erected condition when said first, second and third links are in their erected condition.

3. A frame in accordance with claim 2 wherein said fifth link is pivotally connected to said fourth link at a point on said fifth link intermediate the ends thereof, and said brace is pivotally connected to one end of said fifth link.

4. A frame in accordance with claim 2 wherein said fifth link is connected to said brace at the end of said fifth link located below said fourth link and proximate to said third link when said first, second, and third links are in their erected condition.

5. A frame in accordance with claim 2 wherein said means for establishing said fifth link in an erected condition comprises means adjacent the connection of said brace and said fifth link.

6. A frame in accordance with claim 2 in further combination with means for locking said fifth link in said erected condition.

7. A frame in accordance with claim 6 wherein said means for locking said fifth link in its erected condition comprises means encircling a portion of said fourth link and a portion of said fifth link.

8. A frame in accordance with claim 2 wherein said fifth link comprises a portion of a U-shaped bow.

9. The combination of a boat hull, a soft top including a cover and a frame supporting said cover, said frame including a first link, means pivotally connecting one end of said first link to said boat hull, a second link pivotally connected at one end to said first link intermediate the ends thereof, a third link pivotally connected at one end to said second link at a point spaced from said one end of said second link, and means pivotally connecting the other end of said third link to said boat hull, and means for establishing said frame in an erected condition including a surface supported by and fixed relative to said boat hulls and means on one of said first and said third links for engagement with said surface.

10. A combination in accordance with claim 9 wherein said frame also includes a fourth link pivotally connected at one end to one of said second and third links, a fifth link pivotally connected to said fourth link at the other end thereof, a brace pivotally connected to said fifth link and to said third link, and means on one of said fifth link and said brace and on one of said fourth link and said third link for establishing said fifth link in an erected condition when said first, second and third links are in their erected condition.

11. A combination in accordance with claim 10 wherein said fifth link is pivotally connected to said fourth link at a point on said fifth link intermediate the ends thereof, and said brace is pivotally connected to one end of said fifth link.

12. A combination in accordance with claim 10 wherein said fifth link is connected to said brace at the end of said fifth link located below said fourth link and proximate to said third link.

13. A combination in accordance with claim 10 wherein said means for establishing said fifth link in an erected condition comprises means adjacent the connection of said brace and said fifth link.

14. A combination in accordance with claim 10 in further combination with means for locking said fifth link in said erected condition.

15. A combination in accordance with claim 14 wherein said means for locking said fifth link in its erected condition comprises means encircling a portion of said fourth link and a portion of said fifth link.

16. A combination in accordance with claim 10 wherein said first, second and fifth links respectively comprise portions of three U-shaped bows.

17. A frame for a soft top for a vehicle, said frame comprising a first link adapted at one end to be pivotally connected to a support, a second link pivotally connected at one end to said first link intermediate the ends thereof, and a third link adapted at one end to be pivotally connected to the support and pivotally connected at its other end to said second link at a point spaced from said one end thereof, said first link being engageable with said third link to establish said frame in erected condition when said frame is mounted on the support.

18. A frame in accordance with claim 17 wherein said first and second links respectively form portions of a pair of U-shaped bows.

19. The combination of a boat hull, a soft top including a cover and a frame supporting said cover, said frame including a first link, means pivotally connecting one end of said first link to said boat hull, a second link pivotally connected at one end to said first link intermediate the ends thereof, a third link pivotally connected at one end to said second link at a point spaced from said one end of said second link, and means pivotally connecting the other end of said third link to said boat hull, said means pivotally connecting the other end of said third link to said boat hull being located rearwardly and below said means pivotally connecting said one end of said first link to said boat hull, and said third link being engageable with said means pivotally connecting said one end of said first link to said boat hull to establish said frame in an erected condition.

References Cited by the Examiner

UNITED STATES PATENTS

| | | | |
|---|---|---|---|
| 208,564 | 10/1878 | Bowers | 135—5 |
| 974,072 | 10/1910 | Kenyon | 135—6 |
| 2,817,345 | 12/1957 | Woodruff | 135—6 |

FOREIGN PATENTS 417,913  2/1947  Italy.

HARRISON R. MOSELEY, *Primary Examiner.*

CHARLES E. O'CONNELL, *Examiner.*

C. S. KAIMAN, L. J. SANTISI, W. E. HEATON, *Assistant Examiners.*